US009520820B2

(12) United States Patent
Holmburg et al.

(10) Patent No.: US 9,520,820 B2
(45) Date of Patent: Dec. 13, 2016

(54) METHOD AND APPARATUS FOR AUTO-TUNING AN ELECTRIC MACHINE CURRENT REGULATOR

(71) Applicants: David Holmburg, Moline, IL (US);
Robert Shaw, Moorhead, MN (US);
Long Wu, Fargo, ND (US)

(72) Inventors: David Holmburg, Moline, IL (US);
Robert Shaw, Moorhead, MN (US);
Long Wu, Fargo, ND (US)

(73) Assignee: Deere & Company, Moline, IL (US)

( * ) Notice: Subject to any disclaimer, the term of this patent is extended or adjusted under 35 U.S.C. 154(b) by 63 days.

(21) Appl. No.: 14/581,829

(22) Filed: Dec. 23, 2014

(65) Prior Publication Data

US 2016/0181961 A1  Jun. 23, 2016

(51) Int. Cl.
*H02P 21/00* (2016.01)
*H02P 21/14* (2016.01)

(52) U.S. Cl.
CPC ...................................... *H02P 21/14* (2013.01)

(58) Field of Classification Search
CPC .... H02P 21/14; H02P 21/146; Y02T 10/7258; B60L 2240/421
USPC ...................................................... 318/400.02
See application file for complete search history.

(56) References Cited

U.S. PATENT DOCUMENTS

| 8,228,013 | B2 * | 7/2012 | Liu | .......................... H02P 21/14 318/400.32 |
| 2002/0180296 | A1 * | 12/2002 | Nickoladze | ............ H02K 17/36 310/166 |
| 2004/0056628 | A1 * | 3/2004 | Kandori | ................. G11B 19/20 318/650 |
| 2009/0230900 | A1 | 9/2009 | Bae et al. | |
| 2011/0031909 | A1 | 2/2011 | Ohgushi | |
| 2011/0084640 | A1 * | 4/2011 | Brown | .................... H02P 6/185 318/400.35 |
| 2013/0193899 | A1 * | 8/2013 | Kurosawa | ........... H02P 21/0032 318/504 |

FOREIGN PATENT DOCUMENTS

DE          4418997 A1    12/1995

OTHER PUBLICATIONS

Office Action for corresponding German Application No. 10 2015 225 462.3 dated Apr. 29, 2016.
(Continued)

*Primary Examiner* — Eduardo Colon Santana
*Assistant Examiner* — Gabriel Agared
(74) *Attorney, Agent, or Firm* — Harness, Dickey & Pierce (57) ABSTRACT

In one example embodiment, a motor control unit includes a processor configured to tune a current regulator regulating a supply of electrical current to an electric motor by determining a plurality of variables, the plurality of variables including a stator resistance value, a first inductance value and a second inductance value, the stator resistance value being a resistance value of a stator of the electric motor, the first inductance value being a d-axis inductance of the electric motor and the second inductance value being a q-axis inductance of the electric motor. The processor is further configured to tune the current regulator by determining a plurality of gains based on the determined plurality of variables and generating current commands for operating the electric motor based on the determined plurality of gains.

18 Claims, 4 Drawing Sheets

(56) References Cited

OTHER PUBLICATIONS

Y. Gao, R. Du, Yu Chen, Jian Li and Wei Xu, "Review bf off-line synchronous inductance measurement method for permanent magnet synchronous machines," Transportation Electri-fication Asia-Pacific (ITEC Asia-Pacific), 2014 IEEE Conference and Expo, Beijing, 2014, pp. 1-6.

Search Report for corresponding Great Britain Application No. 1521567.6 dated Apr. 27, 2016.

* cited by examiner

| Stage | 0 | 1 | 2 | 3 | 4 | 5 | 6 | 7 | 8 | 9 |
|---|---|---|---|---|---|---|---|---|---|---|
| Fundamental Frequency (Hz) | 50 | 300 | 350 | 400 | 500 | 600 | 650 | 700 | 750 | 800 |
| Switching Frequency (Hz) | 2K | 4K | 4.5K | 5K | 6K | 7K | 7.5K | 8K | 8.5K | 9K |

Table

Minimum Switching Frequency = 2KHz
Crossover Fundamental Frequency = 300 Hz

FIG. 4

METHOD AND APPARATUS FOR AUTO-TUNING AN ELECTRIC MACHINE CURRENT REGULATOR

FIELD

Example embodiments are related to systems and methods for auto-tuning gains of a current regulator utilized in electric machines.

BACKGROUND

A current regulator which provides current to electric machines must be tuned for each electric machine. The tuning of the current regulator involves determining a set of parameters such as a stator resistance, a direct-axis (d-axis) inductance and quadrature-axis (q-axis) inductance. Without knowledge of these parameters, the process of tuning the current regulator is difficult and prone to inaccurate measurements.

Existing solutions for estimating such parameters include providing a single test point for estimating the stator resistance and applying fixed pulses as voltage waveforms when determining the inductance parameters. Furthermore, existing solutions do not provide for tuning switching frequencies for the control of the electric machine's motor.

SUMMARY

Some embodiments are directed to methods and apparatuses for auto-tuning gain parameters of a current regulator.

In one example embodiment, a motor control unit includes a processor configured to tune a current regulator regulating a supply of electrical current to an electric motor by determining a plurality of variables, the plurality of variables including a stator resistance value, a first inductance value and a second inductance value, the stator resistance value being a resistance value of a stator phase of the electric motor, the first inductance value being a d-axis inductance of the electric motor and the second inductance value being a q-axis inductance of the electric motor. The processor is further configured to tune the current regulator by determining a plurality of gains based on the determined plurality of variables and generating current commands for operating the electric motor based on the determined plurality of gains.

BRIEF DESCRIPTION OF THE DRAWINGS

Example embodiments will be more clearly understood from the following detailed description taken in conjunction with the accompanying drawings. FIGS. 1-4 represent non-limiting, example embodiments as described herein.

DETAILED DESCRIPTION

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Some embodiments are directed to methods and apparatuses for auto-tuning gain parameters of a current regulator.

In one example embodiment, a motor control unit includes a processor configured to tune a current regulator regulating a supply of electrical current to an electric motor by determining a plurality of variables, the plurality of variables including a stator resistance value, a first inductance value and a second inductance value, the stator resistance value being a resistance value of a stator phase of the electric motor, the first inductance value being a d-axis inductance of the electric motor and the second inductance value being a q-axis inductance of the electric motor. The processor is further configured to tune the current regulator by determining a plurality of gains based on the determined plurality of variables and generating current commands for operating the electric motor based on the determined plurality of gains.

In yet another example embodiment, the processor is configured to determine the stator resistance value by determining a first resistance value of the stator when a speed of the electric motor is zero and a current flowing through the electric motor is positive, determining a second resistance value of the stator when the speed of the electric motor is zero and the current flowing through the electric motor is negative, and averaging the first and second resistance values to obtain the stator resistance value.

In yet another example embodiment, the processor is configured to determine the first inductance value by determining a time for a magnitude of a d-axis current flowing through the electric motor to change between lower and upper limits with respect to a reference point, and determining the first inductance value based on the determined time, a voltage value corresponding to the set reference point and the change of the magnitude of the d-axis current.

In yet another example embodiment, the processor is configured to determine the first inductance value based on the determined time, the voltage value corresponding to the set reference point, the change of the magnitude of the d-axis current and the determined stator resistance.

In yet another example embodiment, the processor is configured to determine the second inductance value by determining a time for a magnitude of a q-axis current flowing through the electric motor to change between lower and upper limits with respect to a reference point, and determining the second inductance value based on the determined time, a voltage value corresponding to the set reference point and the change of the magnitude of the q-axis current.

In yet another example embodiment, the processor is configured to determine the second inductance value based on the determined time, the voltage value corresponding to the set reference point, the change of the magnitude of the q-axis current and the determined stator resistance.

In yet another example embodiment, the processor is configured to determine the plurality of gains by determining a plurality of switching frequencies associated with the electric motor speed and determining a virtual resistance value based on the determined stator resistor value. For each of the plurality of switching frequencies, the processor is configured to determine the plurality of gains by determining a first and second proportional gains based on the determined first and second inductance values, and determining a first and second integral gains based on a respective one of the first and second proportional gains, the determined virtual resistance and the determined stator resistance value.

In yet another example embodiment, the processor is further configured to determine, at each of the plurality of switching frequencies, whether the current regulator satisfies a performance requirement using corresponding ones of the plurality of determined gains, and adjust the corresponding ones of the plurality of determined gains based on whether the current regulator satisfies the performance requirement at each of the plurality of switching frequencies.

In yet another example embodiment, the processor determines whether the current regulator satisfies the performance requirement by determining a first ratio between a d-axis current command of the generated current commands and an actual d-axis current of the electric motor, determining a second ratio between a q-axis current command of the generated current commands and an actual q-axis current of the electric motor, and determining that the current regulator meets the performance criteria if the first and second ratios are within a threshold.

In yet another example embodiment, the processor is further configured to supply the generated current commands to an inverter which converts the current commands to three-phase voltages for running the electric motor.

In one example embodiment, a method of tuning a current regulator regulating a supply of electrical current to an electric motor includes determining a plurality of variables, the plurality of variables including a stator resistance value, a first inductance value and a second inductance value, the stator resistance value being a resistance value of a stator phase of the electric motor, the first inductance value being a d-axis inductance of the electric motor and the second inductance value being a q-axis inductance of the electric motor. The method further includes determining a plurality of gains based on the determined plurality of variables and generating current commands for operating the electric motor based on the determined plurality of gains.

In yet another example embodiment, the determining the plurality of variables determines the stator resistance value by, determining a first resistance value of the stator when a speed of the electric motor is zero and a current flowing through the electric motor is positive, determining a second resistance value of the stator when the speed of the electric motor is zero and the current flowing through the electric motor is negative, and averaging the first and second resistance values to obtain the stator resistance value.

In yet another example embodiment, the determining the plurality of variables determines the first inductance value by, determining a time for a magnitude of a d-axis current flowing through the electric motor to change between lower and upper limits with respect to a reference point, and determining the first inductance value based on the determined time, a voltage value corresponding to the set reference point and the change of the magnitude of the d-axis current.

In yet another example embodiment, the determining the plurality of variables determines the first inductance value based on the determined time, the voltage value corresponding to the set reference point, the change of the magnitude of the d-axis current and the determined stator resistance.

In yet another example embodiment, the determining the plurality of variables determines the second inductance value by, determining a time for a magnitude of a q-axis current flowing through the electric motor to change between lower and upper limits with respect to a reference point, and determining the second inductance value based on the determined time, a voltage value corresponding to the set reference point and the change of the magnitude of the q-axis current.

In yet another example embodiment, the determining the plurality of variables determines the second inductance value based on the determined time, the voltage value corresponding to the set reference point, the change of the magnitude of the q-axis current and the determined stator resistance.

In yet another example embodiment, the determining the plurality of gains includes determining a plurality of switching frequencies associated with the electric motor speed and determining a virtual resistance value based on the determined stator resistor value. The determining of the plurality of gains further includes, for each of the plurality of switching frequencies, determining a first and second proportional gains based on the determined first and second inductance values, and determining a first and second integral gains based on a respective one of the first and second proportional gains, the determined virtual resistance and the determined stator resistance value.

In yet another example embodiment, the method further includes determining, at each of the plurality of switching frequencies, whether the current regulator satisfies a performance requirement using corresponding ones of the plurality of determined gains and adjusting the corresponding ones of the plurality of determined gains based on whether the current regulator satisfies the performance requirement at each of the plurality of switching frequencies.

In yet another example embodiment, the determining whether the current regulator satisfies the performance requirement by determining a first ratio between a d-axis current command of the generated current commands and an actual d-axis current of the electric motor, determining a second ratio between a q-axis current command of the generated current commands and an actual q-axis current of the electric motor, and determining that the current regulator meets the performance criteria if the first and second ratios are within a threshold.

In yet another example embodiment, the method further includes supplying the current commands to an inverter which converts the current commands to three-phase voltages for running the electric motor.

Figure 1:
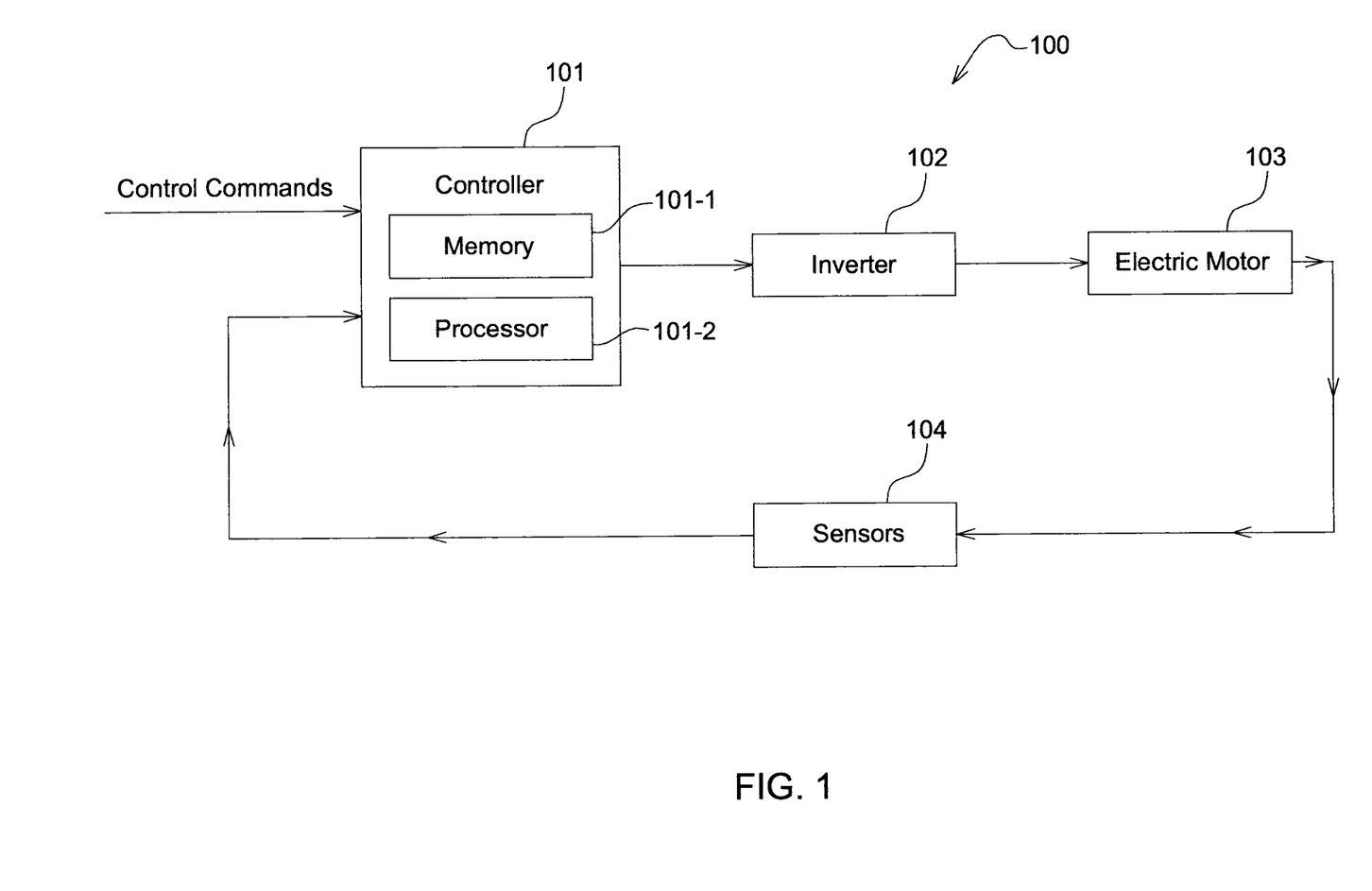
FIG. 1 is a block diagram of an electric machine, according to an example embodiment.

FIG. 1 is a block diagram of an electric machine, according to an example embodiment. As shown in FIG. 1, the electric machine 100 includes a controller 101, an inverter 102, an electric motor 103 and sensors 104.

The controller 101 includes a memory 101-1 and processor 101-2. In one example embodiment, the memory 101-1 has stored thereon, a set of computer-readable instructions for implementing the auto-tuning of a gains that regulate the current command (hereinafter may be referred to as current regulator gains) for supplying voltages to the electric motor 103, as will be described further below with reference to FIG. 2. The processor 101-2 may execute the computer-readable instructions stored on the memory 101-1, thus becoming a special-purpose computer that implements the auto-tuning of the current regulator gains.

The controller 101 may regulate the current and voltage supplied to the electric motor 103. The controller 101 may regulate the current and voltage based on a set of control commands (e.g., desired speed of the electric motor 103), a set of measurements of parameters such as speed, current, position, temperature, etc., of the electric motor 103. The measurements may include noisy measurement, sampled measurements, quantized measurements, etc., which may be obtained via the sensors 104.

In one example embodiment, the controller 101 may be embedded within the inverter 102.

Figure 2:
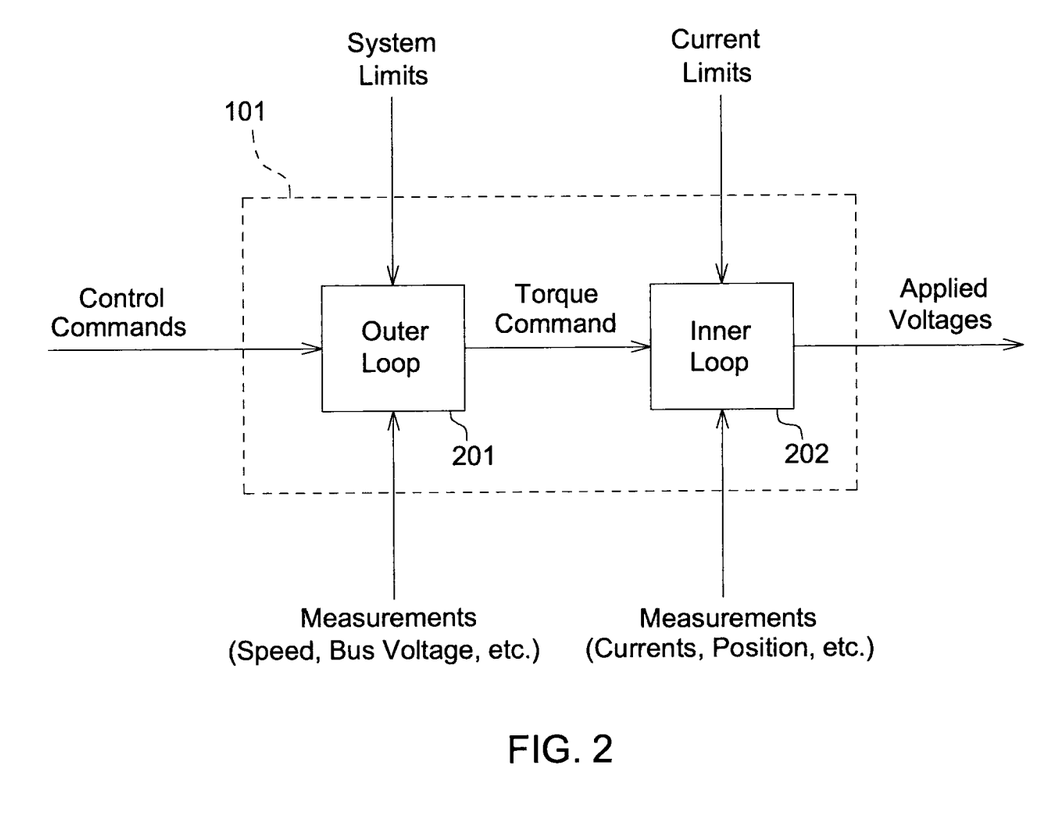
FIG. 2 illustrates the components of a controller of the electric machine of FIG. 1, according to one example embodiment.

FIG. 2 illustrates the components of a controller of the electric machine of FIG. 1, according to one example embodiment. In one example embodiment, the controller 101 may be an alternate current (AC) synchronous speed controller having an outer control loop 201 and an inner control loop 202.

The outer control loop 201 may receive as inputs the control commands (e.g., desired speed of the motor 103, positional and acceleration commands, etc.), system limits (e.g., torque limits) and measurements such as the speed of the electric motor 103, the bus voltage of the electric motor 103, etc., which may be referred to as the actual speed of the electric motor 103). As outputs, the outer control loop 201 may generate torque/current commands for controlling the speed of the electric motor 103, which are fed to the inner control loop 202, as inputs.

The inner control loop 202 may receive as inputs the generated torque/current commands from the outer control loop 201, current limits of the electric machine 100 (which may be determined/dictated by the design of the electric machine 100) and some of the measurement inputs by the sensors 104 such as the current and position of the electric motor 103. The output of the inner control loop 102 may be voltages that are provided as inputs to the inverter 102. Overall, the controller 101 regulates the input commands into q-axis and d-axis current commands that drive the electric motor 103.

The inner control loop 202 may be referred to as a current regulator, which may require tuning. The current regulator gains described above refer to the gains of the inner control loop 202. The current regulator 202 may be any type of proportional-integral (PI) controller and/or any type of proportional-integral-derivative (PID). Such tuning may determine values of a variety of gains by which the torque/current commands are adjusted before being fed into the inverter 102. The tuning of the current regulator 202 may be governed by a set of complex equations, which are known in the art. A manual tuning of the current regulator may be cumbersome or require repetition due to inaccuracies. Accordingly and as will be described with reference to FIG. 3, the example embodiments provide methods and systems for determining/adjusting a set of gains used to tune the current regulator 202.

In one example embodiment, the inverter 102 may convert the d-axis and q-axis current/torque commands from two phase data representations into three phase voltage representations (e.g., three phase voltage representations, such as va*, vb* and vc*) for control of the electric motor 103. The three phase voltages va*, vb* and vc* may be referred to as inverter terminal voltages. The output stage of the inverter 102 (e.g., output terminal voltages va, vb and vc) may provide a pulse-width modulated voltage waveform or other voltage signals for control of the electric motor 103. In an example embodiment, the inverter 102 is powered by a direct current (dc) voltage bus.

The inverter 102 may include a semiconductor drive circuit that drives or controls switching semiconductors (e.g., insulated gate bipolar transistors (IGBT) or other power transistors) to output control signals for the electric motor 103.

The electric motor 103 may be a synchronous AC motor including, but not limited to, non-excited motors, reluctance motors, hysteresis motors, permanent magnet motors and DC-excited motors. In one example embodiment, the electric motor 103 may be a non-synchronous motor such as an induction motor.

The electric motor 103 may further be associated with sensor(s) 104 (e.g., a position sensor, a resolver or encoder position sensor) that is/are associated with a motor shaft or a rotor of the electric motor 103. The sensor(s) 104 may be coupled to the electric motor controller 101 to provide feedback data (e.g., current feedback data, such as phase current values $I_A$, $I_B$ and $I_C$), raw position signals, among other possible feedback data or signals, for example. Other possible feedback data includes, but is not limited to, winding temperature readings, semiconductor temperature readings of the inverter 102, three phase voltage data, other thermal or performance information for the electric motor 103, an angular position of the motor shaft of the electric motor 103, a speed or velocity of the motor shaft of the electric motor 103 and a direction of rotation of the motor shaft of the electric motor 103. The sensor(s) 104 may be mounted on or integral with the motor shaft of the electric motor 103. The output of the sensor(s) 104 may be fed back to the controller 101.

In an example embodiment, the sensor(s) 104 may be coupled to an analog-to-digital converter (not shown) that converts analog raw position data or velocity data to digital raw position or velocity data, respectively to be input into the controller 101.

As described above, the inner loop 202 of the electric motor controller 101 is a current regulator, which requires tuning and that there is a complex set of equations that govern such tuning. While there is no need for an in-depth discussion of the equations that govern the tuning of the current regulator 202, as it is already known, there are four types of gains (which may also be referred to as nominal gains) that are to be tuned.

These four types of gains are divided into two groups of proportional and integral gains, namely a proportional d-axis gain ($K_{pd}$), a proportional q-axis gain ($K_{pq}$), an integral d-axis gain ($K_{id}$) and an integral q-axis gain ($K_{iq}$). In addition to these four gains, the example embodiments provide methods for determining switching frequencies for controlling the electric motor 103, which will be further described with reference to FIG. 3.

In order to determine the above mentioned four nominal gains, a set of parameters should be estimated. The set of parameters include the electric motor 103's stator resistance, the d-axis inductance and the q-axis inductance.

Figure 3:
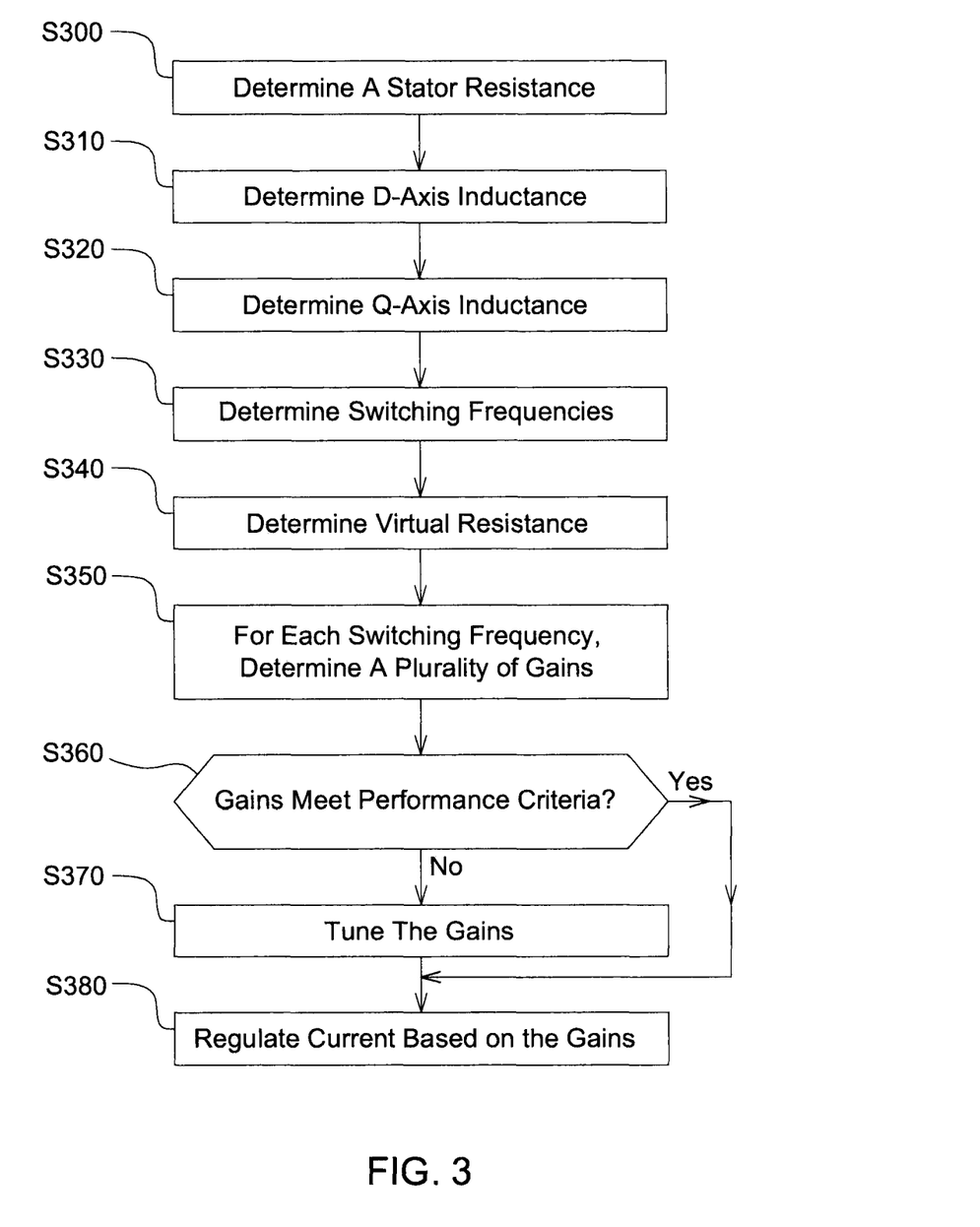
FIG. 3 is a flowchart illustrating a method of auto-tuning gains of a current regulator of the electric machine of FIG. 1, according to an example embodiment.

FIG. 3 is a flowchart describing a method for tuning the current regulator gains, according to one example embodiment. More specifically, by implementing the functionalities described in FIG. 3, the electric motor controller 101, via the processor 101-2, determines the set of parameters and the switching frequencies and subsequently tunes the four mentioned gains based on the determined set of parameters and the determined switching frequencies.

At S300, the processor 101-2 determines the electric motor 103's stator resistance (e.g., per-phase stator resistance of the electric motor 103). In one example embodiment, the processor 101-2 determines the stator's resistance as follows.

In one example embodiment, the d-axis voltage of the electric motor 103 is governed by:

$$v_d(t) = i_d(t) * r_s + L_d * \frac{di_d(t)}{dt} - \omega_e(t) * i_q(t) * L_q \bigg) \tag{1}$$

where $v_d$ is the d-axis voltage, $i_d$ is the d-axis current, $r_s$ is the stator's resistance, $L_d$ is the d-axis inductance, $\omega_e$ is the angular speed of the electric motor 103, $i_q$ and $L_q$ are the q-axis current and inductance values, respectively.

In one example embodiment, if the speed of the electric motor 103 is zero, then the angular speed $\omega_e$ is zero. If the d-axis current $i_d$ is constant, then the rate of change of $i_d$ is zero, thus simplifying equation (1) to:

$$v_d = i_d * r_s \tag{2}$$

Accordingly, the value of $r_s$ may be determined from Eq. (2). However, determining $r_s$ from a single point measurement of $v_d$ and $i_d$ may prove inadequate because such measurement may be sensitive to offsets in the current transducers and the voltage drop of IGBT's and diodes utilized in the electric motor controller 101, the inverter 102 and the sensor(s) 104.

Therefore, in one example embodiment, multiple voltage and current measurements may be made and the resulting slope may be determined, which represents an estimate of the stator's resistance $r_s$. The resulting slope may be determined from the following equation, assuming two sets of measurements:

$$\hat{r}_s = \frac{\Delta v_d}{\Delta i_d} = \frac{v_{d2} - v_{d1}}{i_{d2} - i_{d1}} \tag{3}$$

where $\hat{r}_s$ represents an average value of stator resistance, $\Delta v_d$ is the difference between the two measured voltage values and $\Delta i_d$ is the difference between the two measured current values.

In one example embodiment, Eq. (3) may be applied once for positive current and once for negative current and the resulting $r_s$ values for the positive and negative currents may be averaged to yield consistent and accurate stator resistance estimates.

Once the processor 101-2 determines the stator's resistance, then at S310, the processor 101-2 determines the d-axis inductance. In one example embodiment, the processor 101-2 determines the d-axis inductance as follows.

The d-axis inductance may be determined from Eq. (1) above. The accurate current response to a step change in d-axis voltage is an exponential response (assuming zero-speed for the electric motor 103). However, the initial rise/fall in current due to the step change may be approximated by a straight line. Accordingly, by injecting a square-wave voltage having a frequency, which may be high relative to the resistance/inductance time constant, an approximate triangle-shaped current may be generated, which changes between a minimum and a maximum limit of the hysteretic controller. Such injection method may represent a hysteretic control of the current about a set/reference point (e.g., zero). A set point of zero may result, in one example embodiment, in a zero voltage drop across the stator's resistance and thus the $i_d(t)*r_s$ in Eq. (1) may be neglected when estimating the d-axis inductance.

Accordingly, the d-axis inductance $\hat{L}_d$, based on Eq. (1), may be determined as:

$$\hat{L}_d = \frac{\Delta t * v_d}{\Delta i_d} \quad (4)$$

where $\Delta t$ is the time it takes for the current to change between a minimum value to a maximum value in the triangle wave and $\Delta i_d$ is the change in current between a minimum and a maximum limit of the hysteretic controller at a given voltage command $v_d$.

It is known that the electric motor's inductance varies with current magnitude due to saturation and that purely d-axis current results in zero torque being applied to the electric motor 103. Because d-axis current results in zero torque, the set point may be moved away from zero without resulting in the electric motor 103 spinning. However, a non-zero reference point introduces an average voltage drop across the electric motor's resistance, which may be compensated for in estimating the d-axis inductance.

Therefore, in one example embodiment, Eq. (4) may be modified as follows when determining the d-axis inductance:

$$\hat{L}_d = \frac{\Delta t * (v_d - r_s * i_{d-avg})}{\Delta i_d} \quad (5)$$

where $\Delta t$, $\Delta i_d$, $v_d$ and $r_s$ are as described above and the $i_{d-avg}$ is the current associated with the voltage drop across the electric motor 103's resistance (e.g., $r_s*i_{d-avg}$=the voltage drop across the electric motor 103's resistance). In one example embodiment, $r_s$ as determined at S300 may be used in Eq. (5) when determining the d-axis inductance.

In one example embodiment, the d-axis inductance may be determined for various average current set points and therefore, the d-axis inductance may be determined across variations in the d-axis current.

At S320, the processor 101-2 may determine the q-axis inductance in the exact same manner as the d-axis inductance using the hysteretic control of the current about a set point. In one example embodiment, the processor 101-2 may determine the q-axis inductance as follows.

In one example embodiment, the equation governing the q-axis voltage of the electric motor may be expressed as:

$$v_q(t) = i_q(t)*r_s + L_q * \frac{di_q(t)}{dt} + \omega_e(t)(\lambda_f + i_d(t)*L_d)p \quad (6)$$

where $v_q$ is the q-axis voltage, $i_q$ is the q-axis current, $r_s$ is the stator's resistance, $L_q$ is the q-axis inductance, $\omega_e$ is the angular speed of the electric motor 103, $\lambda_f$ is the amplitude of the flux induced by the rotor of the electric motor 103, $i_d$ and $L_d$ are the q-axis current and inductance values, respectively.

With regard to the estimation of q-axis inductance, the q-axis inductance produces torque and thus such torque is accounted for by physically locking the electric motor 103 and preventing the electric motor 103 from spinning (e.g. using a ranch or any other tool to manually prevent the motor from rotating). At zero average current, the spinning of the electric motor 103 results in the oscillation of the electric motor 103 and the determination of the q-axis inductance may be determined by assuming a zero average current.

At zero average current, the first term $i_q(t)*r_s$ may be ignored as it is equal to zero. The term $\omega_e(t)(\lambda_f+i_d(t)*L_d)$ is also equal to zero and may be ignored as the motor's speed may be neglected (i.e., the motor is oscillating and not rotating, hence its angular speed may be considered zero). Accordingly, the simplified version of Eq. (6) for determining the q-axis inductance estimate may be as follows:

$$\hat{L}_q = \frac{\Delta t * v_q}{\Delta i_q} \quad (7)$$

Having determined the estimates of the stator resistance, the d-axis inductance and the q-axis inductance, the processor 101-2 may determine the four gains described above.

The initial step in determined the four gains is to determine the switching frequencies for different speed ranges of the electric motor 103. Each of the different switching frequencies may correspond to a different speed range of the electric motor 103. At S330, the processor 101-2 determines the switching frequencies.

In one example embodiment, the processor 101-2 determines the switching frequencies based on a minimum switching frequency of the electric motor 103 and the crossover fundamental frequency of the electric motor 103. The minimum switching frequency and the crossover fundamental frequency may be design parameters given by the manufacturer of the electric motor 103. The minimum switching frequency may be based on the d-axis and q-axis inductances of the motor.

Figure 4:
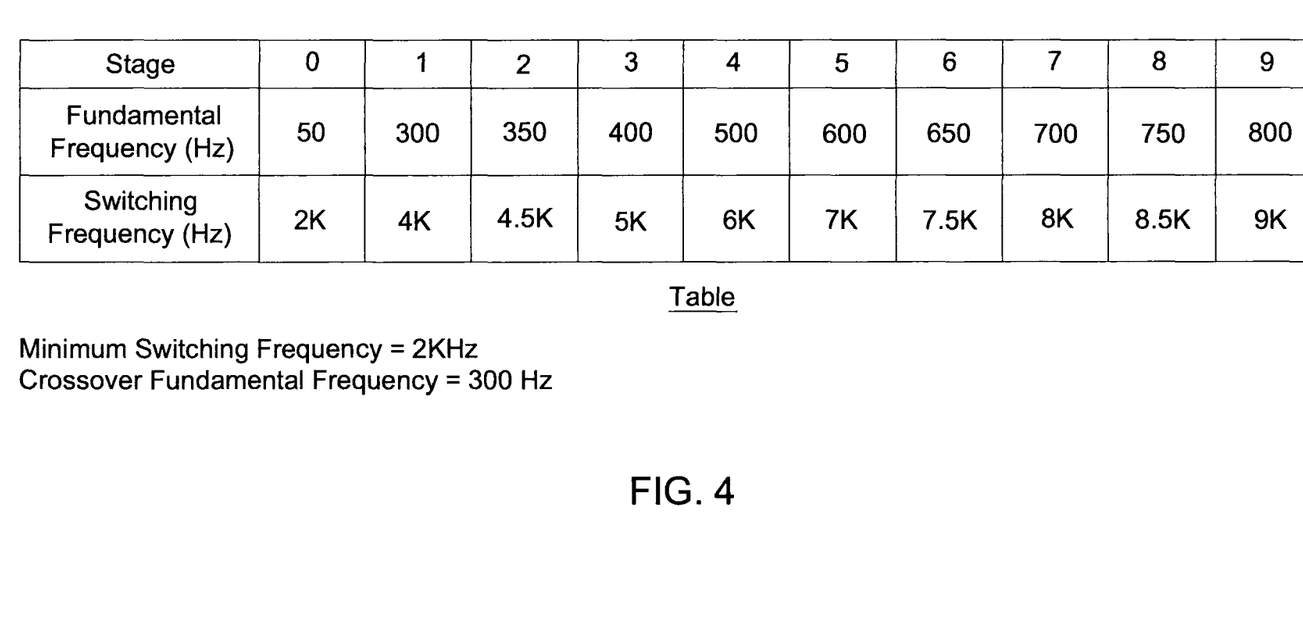
FIG. 4 illustrates an example of table of switching frequencies of an electric motor of the electric machine of FIG. 1, according to an example embodiment.

FIG. 4 illustrates an example of table of switching frequencies of an electric motor of the electric machine of FIG. 1, according to an example embodiment. In the example embodiment shown in FIG. 4, one switching frequency is determined for each stage, where each stage corresponds to a different speed range of the electric motor 103 (e.g., represented in revolutions per minute (RPM)). As can be seen from the table of FIG. 4, the full speed range of the electric motor is divided into 10 different sub-ranges. For example, stage 0 may correspond to the speed range of 0-1000 RPM, stage 1 may correspond to the speed range of 1001-2000 RPM, etc. However, the number of sub-ranges is not limited to that shown in FIG. 4 and the speed range of the electric motor 103 may be divided up into any arbitrary number of sub-ranges. The speed range of the electric motor 103 may be divided up into equal sub-ranges or sub-ranges of varying length (e.g., one sub-range may cover a longer range than the other sub-ranges).

Furthermore, each stage may have an associated fundamental frequency. In one example embodiment, the fundamental frequency of each stage may be determined based on the highest speed of the electric motor 103 in that stage. For example, if stage 0 corresponds to the speed range of 0-1000 RPM, the fundamental frequency of stage 0 may be determined based on the 1000 RPM speed of the electric motor 103.

In one example embodiment, the speed of the motor (in RPM), may be represented as:

$$\omega = 2 * 60 * f/n \qquad (8)$$

where $\omega$ is the speed of the motor, f is the fundamental frequency and n is the number of poles of the electric motor 103. The electric motor 103 may have different number of poles such as 2, 4, etc.

Accordingly, for the highest speed in each sub-range or stage, the fundamental frequency f may be determined from Eq. (8).

Having determined the fundamental frequency for each stage, a switching frequency for each stage is determined such that at least a ratio of 1 to 10 (or in some instances at least a ratio of 1 to 15 is observed) is observed between the fundamental frequency and the switching frequency. For example, in the table shown in FIG. 4, the fundamental frequency of stage 0 is determined to be 50 Hz and therefore, the switching frequency of stage 0 is determined to be at least 10 times the fundamental frequency (2 kHz is at least 10 times the fundamental frequency of 50 Hz).

As described above, each electric motor may have a minimum switching frequency and a crossover fundamental frequency. In the example embodiment shown in FIG. 4, it is assumed that the minimum switching frequency and the crossover fundamental frequency are 2 kHz and 300 Hz, respectively.

If for any given stage, the determined switching frequency is less that the electric motor's minimum switching frequency, then the electric motor's minimum switching frequency will be used instead of the determined switching frequency. Therefore, for none of the stages 0-9, a corresponding switching frequency less than 2 kHz will be used in the example embodiment shown in FIG. 4.

In the example embodiment shown in FIG. 4 and as described above, the determined switching frequency may be determined as 1 kHz, which is still at least 10 times the fundamental frequency of stage 0 (i.e., 1 kHz is at least 10 times 50 Hz). However, because the determined switching frequency is less than the electric motor's minimum switching frequency (i.e., 1 kHz<2 kHz), the minimum switching frequency of 2 kHz is used instead.

Moreover, the relationships discussed above for determining the switching frequency with respect to the fundamental frequency of each stage is observed until a fundamental frequency for a given stage is at least equal to the electric motor's fundamental frequency. Thereafter, for every increase of 100 Hz in the fundamental frequency, the corresponding switching frequency may be increased by 1 kHz.

For example, in the table shown in FIG. 4, the fundamental frequency at stage 1 is 300 Hz, which is equal to the exemplary crossover fundamental frequency of 300 Hz of the electric motor 103. At Stage 2, the corresponding fundamental frequency of 350 Hz, has only increased by 50 Hz with respect to stage 1 and therefore, a corresponding switching frequency of 4.5 kHz, is determined as described above. However, at stage 3, the corresponding fundamental frequency is 400 Hz, which is 100 Hz more than that of stage 1. Therefore, the switching frequency at stage 3 is increased by 1 kHz compared to stage 1, to 5 kHz. Similarly, at stage 4, the fundamental frequency is increased by 100 Hz compared to stage 3 and therefore, the corresponding switching frequency is also increased by 1 kHz compared to stage 3, to 6 kHz.

After the table of switching frequencies is determined, the processor 101-2, at S340, determines the electric motor 103's virtual resistance. An electric motor's virtual resistance may be an imaginary (not actual) resistance of the electric motor 103, used by the current regulator to improve the electric motor's dynamic control stiffness around zero speed. In one example embodiment, this virtual resistance may be between 5 to 10 times the stator resistance $r_s$, which may be considered as the electric motor's true resistance. In one example embodiment, the virtual resistance is determined as $R_v = 6 * \hat{r}_s$.

Having determined the set of parameters (stator's resistance, d-axis inductance and q-axis inductance), the table of switching frequencies and the virtual resistance, the processor 101-2 at S350 may determine the four gains (q-axis and d-axis proportional and integral gains) as follows.

At S350, the processor 101-2 may determine the following 5 values for each of the switching frequencies of the different stages, as shown in the table of FIG. 4. In one example embodiment, the processor 101-2 uses the corresponding determined switching frequency for each fundamental frequency from the table of FIG. 4 and determines a corresponding bandwidth BW. In one example embodiment, the processor 101-2 may determine the bandwidths BWs as follows:

$$BW = f_{sw}/35 \qquad (9)$$

where $f_{sw}$ is the fundamental frequency that corresponds to each switching frequency, as shown in FIG. 4 for example.

In one example embodiment, the processor 101-2 determines whether the determined BW is greater than a maximum threshold. The maximum threshold may be a design parameter. This maximum threshold may be 150 Hz, in one example embodiment. If the determined BW is greater than the maximum threshold, then the value of the maximum threshold is used as the BW value for the corresponding switching frequency. If not, the value determined based on Eq. (9) will be used.

Once the value of BW is determined for each stage, then for the same stage, the processor 101-2 determines the four gains ($K_{pq}$, $K_{pd}$, $K_{iq}$ and $K_{id}$) based on the following equations (7)-(10), respectively.

$$K_{pq} = 2 * \pi * BW * \hat{L}_q \qquad (10)$$

$$K_{pd} = 2 * \pi * BW * \hat{L}_d \qquad (11)$$

-continued $$K_{iq} = K_{pq} * \frac{R_v + \hat{r}_s}{\hat{L}_q} = 2*\pi*BW*(R_v + \hat{r}_s) \qquad (12)$$

$$K_{id} = K_{pd} * \frac{R_v + \hat{r}_s}{\hat{L}_d} = 2*\pi*BW*(R_v + \hat{r}_s) \qquad (13)$$

$K_{pq}$ and $K_{qd}$ may be referred to as proportional gains of the current regulator 202, while $k_{iq}$ and $k_{id}$ may be referred to as integral gains of the current regulator 202.

In one example embodiment, the processor 101-2 may log all the estimated parameters and the resulting gains for each stage in a table in the memory 101-1.

At S360, the processor 101-2 may evaluate the determined gains in order to determine whether a set of given (and/or predetermined) performance criteria are met. In one example embodiment and in order to make such determination, the processor 101-2 may perform the following steps.

First, the processor 101-2 determines a current command for each of the switching frequencies in the table shown in FIG. 4. The processor 101-2 determines a d-axis and a q-axis command at each of the switching frequencies. For each set of q-axis and d-axis current commands, the processor 101-2 receives a set of actual d-axis and q-axis of the electric motor 103. The processor 101-2 may receive the set of actual d-axis and q-axis current commands via sensors 104.

Thereafter, the processor 101-2 may determine a ratio between the commanded d-axis current ($I_d$) and the actual d-axis current $I_d$ measured by the sensors 104. Similarly, the processor 101-2 may determine a ratio between the commanded q-axis current ($I_q$) and the actual q-axis current $I_q$ measured by the sensors 104.

The processor 101-2 may then determine whether each of the ratios are within a given threshold span. In one example embodiment, the threshold span may be set between 0.9 to 1.1 (e.g., 90% to 110%, when expressed in terms of percentage). That is the processor 101-2 determines whether the actual d-axis current $I_d$ is within 90% to 110% of the commanded d-axis current $I_d$. Similarly, the processor 101-2 may determine whether the actual q-axis current $I_q$ is within 90% to 110% of the commanded q-axis current $I_q$. The span of the threshold is not limited to the example described above and may be a configurable variable that is determined based on empirical studies. The threshold may alternatively be chosen to indicate the amount of discrepancy between the actual d-axis current $I_d$ and the commanded d-axis $I_d$ and the amount of discrepancy between the actual q-axis $I_q$ and the commanded q-axis $I_q$.

If the ratios are within the said threshold span, then at S360, the processor 101-2 determines that the performance criteria are met. Thereafter, the processor 101-2 may proceed to S380, and regulate the current and voltage supplied to the inverter 102 and subsequently to the electric motor 103 using the determined gains.

However, if any of the ratios are not within the said threshold span, then the process may proceed to S370, where the processor 101-2 adjusts the gains in order to bring the ratios down to within the threshold span (e.g., bring the actual d-axis current $I_d$ and the actual q-axis current $I_q$ values to be within 90% to 110% of the commanded d-axis current $I_d$ and q-axis current $I_q$, respectively). The processor 101-2 may adjust the gains as follows.

At each of the determined switching frequencies, the ratios between the actual d-axis current $I_d$ and q-axis current $I_q$ and the corresponding commanded d-axis current $I_d$ and q-axis current $I_q$, not being within the threshold, may be due to several factors. One factor may be too much current ripple. Accordingly and in one example embodiment, the processor 101-2 may adjust the gains by increasing the corresponding determined switching frequencies of the controller 101 (the switching frequency may be referred to as pulse width modulation frequency). In one example embodiment, the corresponding switching frequency of the controller 101 may be increased such that a ratio between the increased switching frequency and the fundamental frequency at each stage is increased from 10:1 or 11:1, as described above, to 13:1 or 14:1. Based on the increased switching frequencies, the values of the gains and the BW may be updated using Eqs. 9-13.

Another factor may be the electric motor's stability. Accordingly and in one example embodiment, the processor 101-2 may adjust the gains by decreasing the maximum bandwidth BW, which in the example embodiment described above, was set to 150 Hz. In one example embodiment, the maximum bandwidth BW may be reduced by half (e.g., maximum bandwidth BW may be set at 75 Hz).

Once the processor 101-2 adjusts the bandwidth at each of the determined switching frequencies, the gains described by Eqs. 10-13 may be adjusted accordingly. Thereafter and upon adjusting the gains, the processor 101-2 may proceed to S380. At S380, the processor 101-2 may regulate the current and voltage supplied to the inverter 102 and subsequently to the electric motor 103 using the adjusted gains.

In yet another example embodiment, the performance valuation of the gains determined by the processor 101-2 as described above, may be determined independently and outside the controller 101.

This independent performance evaluation may be as follows. For each of the determined switching frequencies, a current command (current magnitude and a corresponding angle) is determined that results in the maximum motor torque production for the electric motor 103 while the maximum allowed current/voltage limits of the electric motor 103 are not exceeded. Exceeding the maximum allowed current/voltage limits may damage the electric motor 103.

Second, for each current command, the processor 101-2 evaluates several step responses and a steady-state performance of the current regulator 101. In one example embodiment, a step response analysis includes determining how closely the actual d-axis current $I_d$ and actual q-axis current $I_q$ of the electric motor 103 tracks changes in a current commands. If the tracking is within a given time-frame (e.g., a given time threshold), then it is determined that the step response of the electric motor 103 to the current command that is regulated using the determined gains at each stage, is acceptable.

For example, a first current command (e.g., 10 A) may be provided by the controller 101 to the electric machine 103, using the determined gains as described above. The first current command results in actual d-axis current $I_d$ and the actual q-axis current $I_q$ values at the electric motor 103 being measured by the sensors 104 (e.g., an actual d-axis current $I_d$ of approximately −8 A and an actual q-axis current $I_q$ of approximately 6 A).

Thereafter, a second current command (e.g., 200 A) may be provided by the controller 101 to the electric machine 103, using the determined gains as described above. The second current command results in actual d-axis current $I_d$ and the actual q-axis current $I_q$ values at the electric motor 103 being measured by the sensors 104 (e.g., an actual d-axis current $I_d$ of approximately −150 A and an actual q-axis current $I_q$ of approximately 80 A).

If the change of each of the actual d-axis current $I_d$ and the actual q-axis current $I_q$, from their respective value in response to the first current command to their respective value in response to the second current command, is within a threshold period of time (e.g., 50 ms), then it is determined that the step response of the electric motor 103 is acceptable. Otherwise, the determined gains are adjusted such that the change is within the threshold period of time. The threshold period of time may be a configurable variable that is determined based on empirical studies.

As can be recalled from the discussion above, at each of the determined switching frequencies a current command is determined that results in maximum torque production at the electric motor 103 while the current/voltage limits of the electric motor 103 are observed. As also mentioned above, there are several step responses that may be evaluated. One of the step responses may be a response to current commands that result in a generated torque of the electric motor 103 to vary between 0% to 95% of maximum motoring torque. Another step response may be a response to current commands that result in a generated torque of the electric motor 103 to vary between 0% to 95% of the maximum generating torque. Another step response may be a response to current commands that result in a generated torque of the electric motor 103 to vary between 95% of maximum motoring torque to 95% of the maximum generating torque. Furthermore, another step response may be a response to current commands that result in a generated torque of the electric motor 103 to vary between 95% of maximum generating torque to 95% of the maximum motoring torque.

For each of the above described step responses, a first current command and a second current command similar to that described in the above example embodiment, may be provided and the actual d-axis current $I_d$ and the actual q-axis current $I_q$ of the electric motor 103 may be observed in order to determine whether any change in the actual d-axis current $I_d$ and the actual q-axis current $I_q$ values track the changes in the commanded d-axis current $I_d$ and the commanded q-axis current $I_q$ values closely enough (e.g., based on the threshold period of time, described above).

In addition to the several step responses evaluated, a steady-state performance of the electric motor 103 may also be evaluated. In one example embodiment, the steady-state performance of the electric motor 103 may be determined as follows.

A current transducer may be utilized to evaluate the steady-state performance of the electric motor 103 at each of the determined switching frequencies. One method of evaluation may be referred to as the average three-phase current method. According to the three-phase current method, each of the three-phase currents of the machine windings (e.g., $I_A$, $I_B$ and $I_C$) may be measured and an average value thereof may be obtained. If, at each of the determined switching frequencies, the average value is within a certain threshold of the current command, then the current transducer determines that the steady-state performance of the electric motor 103 is acceptable. If not, the determined gains are adjusted such that the average three-phase current is brought within the certain threshold of the current command. The certain threshold may be a design parameter that is configurable and may be determined based on empirical studies.

Another method, which may be utilized by the current transducer is current unbalance method. According to the current unbalance method, a difference between the maximum and minimum of the three-phase currents is determined and the resulting difference is divided by the mean of the three-phase currents. If the resulting ratio, at each of the determined switching frequencies is within a threshold (e.g., 1%, 2%, etc.) of the command current, then it is determined that the steady-state performance of the electric motor 103 is acceptable. If not, the determined gains are adjusted such that the ratio of the difference between the maximum and minimum of the three-phase currents and the mean of the three-phase currents, is within the threshold. The threshold may be a design parameter that is configurable and may be determined based on empirical studies.

In one example embodiment and as another method, at each of the determined switching frequencies, a total harmonic distortion (THD) and a root mean square (RMS) current of each phase of the electric motor 103 is measured in response to current commands for generating 100% motoring and generating torques. If the measured RMS current and THD are within appropriate thresholds of the commanded currents at each of the determined switching frequencies (e.g., within 1% and/or 10% of the commanded current), then it is determined that the steady-state performance of the electric motor 103 is acceptable. If not, the determined gains may be adjusted such that the measured RMS current and the THD are within the designated thresholds. The thresholds may be design parameters that are configurable and may be determined based on empirical studies.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:
1. A motor control unit comprising:
a processor configured to tune a current regulator regulating a supply of electrical current to an electric motor by,
determining a plurality of variables, the plurality of variables including a stator resistance value, a first inductance value and a second inductance value, the stator resistance value being a resistance value of a stator phase of the electric motor, the first inductance value being a d-axis inductance of the electric motor and the second inductance value being a q-axis inductance of the electric motor;
determining a plurality of gains by,
determining a plurality of switching frequencies associated with a speed of the electric motor,
determining a virtual resistance value based on the determined stator resistor value,
for each of the plurality of switching frequencies,
determining a first and second proportional gains based on the determined first and second inductance values, and
determining a first and second integral gains based on a respective one of the first and second proportional gains, the determined virtual resistance and the determined stator resistance value, the first and second integral gains associated with each of the plurality of switching frequencies forming the plurality of gains; and
generating current commands for operating the electric motor based on the determined plurality of gains.
2. The motor control unit of claim 1, wherein the processor is configured to determine the stator resistance value by, determining a first resistance value of the stator when a speed of the electric motor is zero and a current flowing through the electric motor is positive, determining a second resistance value of the stator when the speed of the electric motor is zero and the current flowing through the electric motor is negative, and averaging the first and second resistance values to obtain the stator resistance value.

3. The motor control unit of claim 1, wherein the processor is configured to determine the first inductance value by, determining a time for a magnitude of a d-axis current flowing through the electric motor to change between lower and upper limits with respect to a reference point, and determining the first inductance value based on the determined time, a voltage value corresponding to the set reference point and the change of the magnitude of the d-axis current.

4. The motor control unit of claim 3, wherein the processor is configured to determine the first inductance value based on the determined time, the voltage value corresponding to the set reference point, the change of the magnitude of the d-axis current and the determined stator resistance.

5. The motor control unit of claim 1, wherein the processor is configured to determine the second inductance value by, determining a time for a magnitude of a q-axis current flowing through the electric motor to change between lower and upper limits with respect to a reference point, and determining the second inductance value based on the determined time, a voltage value corresponding to the set reference point and the change of the magnitude of the q-axis current.

6. The motor control unit of claim 5, wherein the processor is configured to determine the second inductance value based on the determined time, the voltage value corresponding to the set reference point, the change of the magnitude of the q-axis current and the determined stator resistance.

7. The motor control unit of claim 1, wherein the processor is further configured to, determine, at each of the plurality of switching frequencies, whether the current regulator satisfies a performance requirement using corresponding ones of the plurality of determined gains; and adjust the corresponding ones of the plurality of determined gains based on whether the current regulator satisfies the performance requirement at each of the plurality of switching frequencies.

8. The motor control unit of claim 7, wherein the processor determines whether the current regulator satisfies the performance requirement by, determining a first ratio between a d-axis current command of the generated current commands and an actual d-axis current of the electric motor, determining a second ratio between a q-axis current command of the generated current commands and an actual q-axis current of the electric motor, and determining that the current regulator meets the performance criteria if the first and second ratios are within a threshold.

9. The motor control unit of claim 1, wherein the processor is further configured to supply the generated current commands to an inverter which converts the current commands to three-phase voltages for running the electric motor.

10. A method of tuning a current regulator regulating a supply of electrical current to an electric motor, the method comprising:

determining a plurality of variables, the plurality of variables including a stator resistance value, a first inductance value and a second inductance value, the stator resistance value being a resistance value of a stator phase of the electric motor, the first inductance value being a d-axis inductance of the electric motor and the second inductance value being a q-axis inductance of the electric motor;

determining a plurality of gains by, determining a plurality of switching frequencies associated with a speed of the electric motor, determining a virtual resistance value based on the determined stator resistor value, for each of the plurality of switching frequencies, determining a first and second proportional gains based on the determined first and second inductance values, and determining a first and second integral gains based on a respective one of the first and second proportional gains, the determined virtual resistance and the determined stator resistance value, the first and second integral gains associated with each of the plurality of switching frequencies forming the plurality of gains; and generating current commands for operating the electric motor based on the determined plurality of gains.

11. The method of claim 10, wherein the determining the plurality of variables determines the stator resistance value by, determining a first resistance value of the stator when a speed of the electric motor is zero and a current flowing through the electric motor is positive, determining a second resistance value of the stator when the speed of the electric motor is zero and the current flowing through the electric motor is negative, and averaging the first and second resistance values to obtain the stator resistance value.

12. The method of claim 10, wherein the determining the plurality of variables determines the first inductance value by, determining a time for a magnitude of a d-axis current flowing through the electric motor to change between lower and upper limits with respect to a reference point, and determining the first inductance value based on the determined time, a voltage value corresponding to the set reference point and the change of the magnitude of the d-axis current.

13. The method of claim 12, wherein the determining the plurality of variables determines the first inductance value based on the determined time, the voltage value corresponding to the set reference point, the change of the magnitude of the d-axis current and the determined stator resistance.

14. The method of claim 10, wherein the determining the plurality of variables determines the second inductance value by, determining a time for a magnitude of a q-axis current flowing through the electric motor to change between lower and upper limits with respect to a reference point, and determining the second inductance value based on the determined time, a voltage value corresponding to the set reference point and the change of the magnitude of the q-axis current.

15. The method of claim 14, wherein the determining the plurality of variables determines the second inductance value based on the determined time, the voltage value corresponding to the set reference point, the change of the magnitude of the q-axis current and the determined stator resistance.

16. The method of claim 10, further comprising:
determining, at each of the plurality of switching frequencies, whether the current regulator satisfies a performance requirement using corresponding ones of the plurality of determined gains; and
adjusting the corresponding ones of the plurality of determined gains based on whether the current regulator satisfies the performance requirement at each of the plurality of switching frequencies.

17. The method of claim 16, wherein the determining whether the current regulator satisfies the performance requirement includes,
determining first ratio between a d-axis current command of the generated current commands and an actual d-axis current of the electric motor,
determining a second ratio between a q-axis current command of the generated current commands and an actual q-axis current of the electric motor, and
determining that the current regulator meets the performance criteria if the first and second ratios are within a threshold.

18. The method of claim 10, further comprising:
supplying the current commands to an inverter which converts the current commands to three-phase voltages for running the electric motor.

* * * * *